March 30, 1965

J. RUSSELL 3,175,812

APPARATUS FOR SIMULTANEOUSLY FEEDING AND
MIXING COMPONENTS TO MAKE CONCRETE

Filed Feb. 16, 1961

INVENTOR.
JAMES RUSSELL

BY *Isler & Ornstein*

ATTORNEYS

INVENTOR.
JAMES RUSSELL
BY
ATTORNEYS

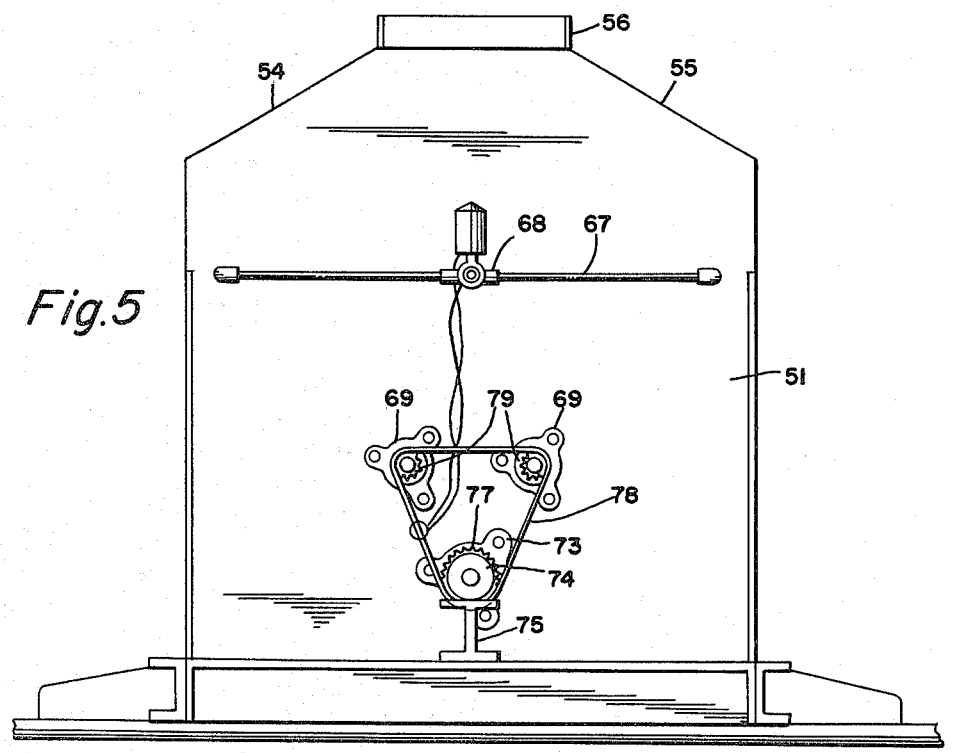
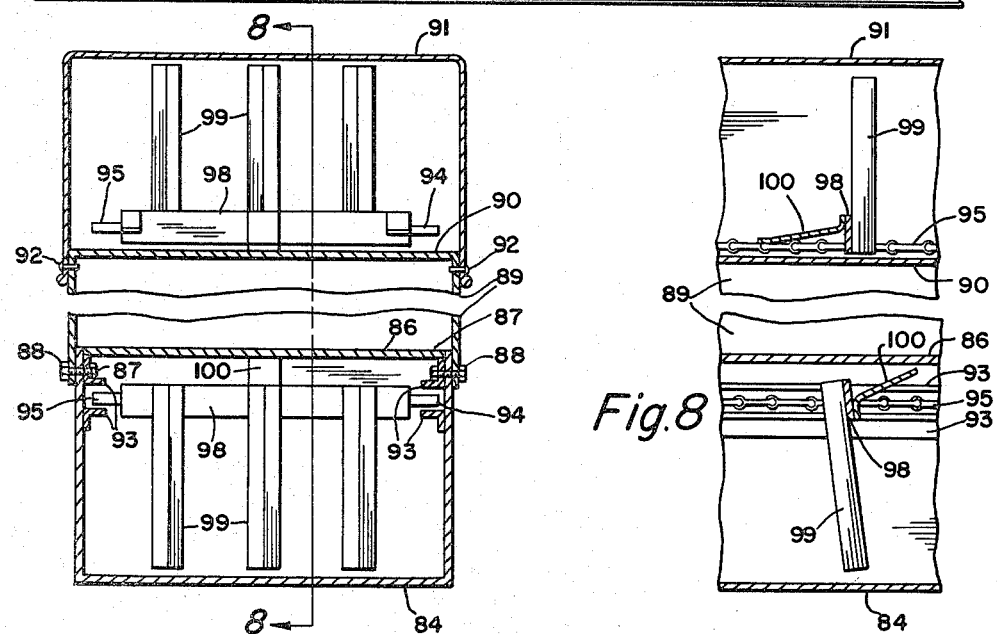

March 30, 1965 J. RUSSELL 3,175,812
APPARATUS FOR SIMULTANEOUSLY FEEDING AND
MIXING COMPONENTS TO MAKE CONCRETE
Filed Feb. 16, 1961 7 Sheets-Sheet 5

INVENTOR.
JAMES RUSSELL
BY Isler E. Ornstein
ATTORNEYS

INVENTOR.
JAMES RUSSELL
BY Isler & Ornstein
ATTORNEYS

United States Patent Office 3,175,812
Patented Mar. 30, 1965

3,175,812
APPARATUS FOR SIMULTANEOUSLY FEEDING AND MIXING COMPONENTS TO MAKE CONCRETE
James Russell, 21055 Lorain Road, Fairview Park, Ohio
Filed Feb. 16, 1961, Ser. No. 89,812
2 Claims. (Cl. 259—164)

This invention relates generally to apparatus for making or preparing concrete.

A primary object of the invention is to provide a novel and highly advantageous apparatus for mixing and distributing or laying the concrete.

Another object of the invention is to provide apparatus of the character described, which greatly reduces the labor and cost of preparing and pouring or distributing concrete.

A further object of the invention is to provide apparatus of the character described, which can be transported quickly and easily to the field or site at which the concrete is to be poured or laid.

Other objects and advantages of my invention will be apparent during the course of the following description.

In the accompanying drawings forming a part of this specification, and in which like numerals are employed to designate like parts throughout the same, FIG. 1 is a top plan view of the apparatus or unit for mixing the materials for forming the concrete;

FIG. 5 is an elevational view, from the right side of FIG. 3;

FIG. 6 is a fragmentary perspective view of one of the concrete mixing elements;

FIG. 7 is a fragmentary cross-sectional view, on an enlarged scale, taken on the line 7—7 of FIG. 2;

FIG. 8 is a fragmentary cross-sectional view, taken on the line 8—8 of FIG. 7;

Figure 1:
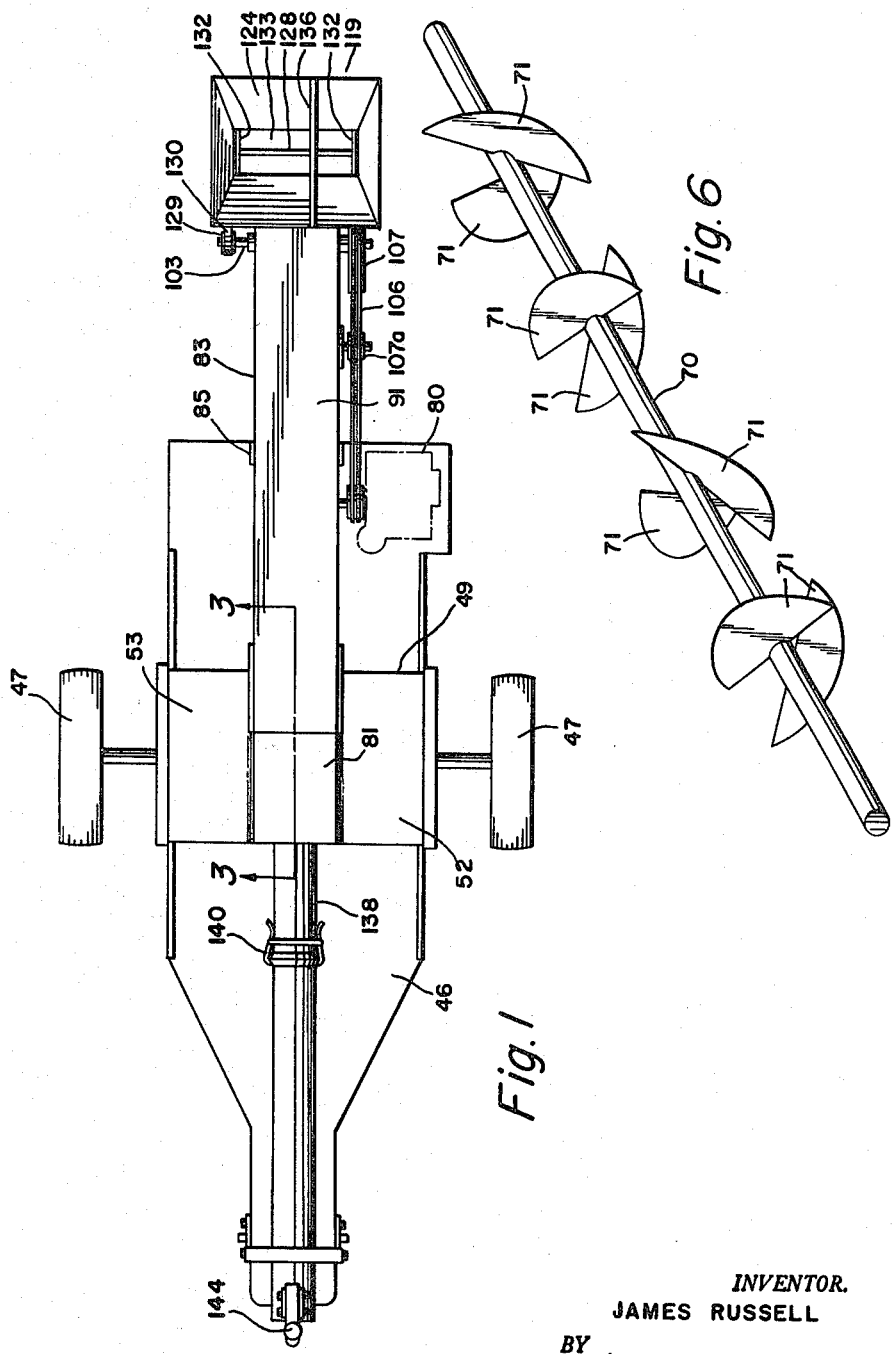

The invention contemplates a unit for mixing concrete forming materials to form concrete of a desired consistency, and for distributing or laying the concrete. This unit embodies the use of a standard or conventional trailer, as a support for the concrete mixing apparatus, whereby such concrete mixing apparatus may be moved or transported to the site at which the concrete is to be laid.

Referring more particularly to the drawings, there is disclosed a bed 46 mounted on wheels 47 and 48.

Mounted on the bed 46, between the wheels 48, is a bin 49 which is generally rectangular in form, and comprises a front wall 50, a rear wall 51, sloping top walls 52 and 53 which extend between the upper edges of the front and rear walls, and vertical side walls 54 and 55 which extend downwardly from the lower edges of the top walls and between the side edges of the front and rear walls.

A rectangular collar 56 extends upwardly from the upper edges of the walls 50, 51, 52 and 53, and serves a purpose to be presently described.

The bin further includes a hopper wall 57, which extends downwardly from the lower edge of the side wall 54 and between the walls 50 and 51. The wall 57 slopes inwardly and terminates at its lower edge in a trough 58 (FIGS. 3 and 4) of semi-circular cross-section, this trough extending between the walls 50 and 51.

A rectangular opening 59 (FIG. 4) is formed between the edge 60 of the trough 58 and the lower edge 61 of the side wall 55, which opening is for the purpose of permitting access to the interior of the hopper for inspection, repair or replacement purposes. The opening 59 is normally closed by means of a door 62 which is mounted for slidable movement in tracks formed by angles 63 which are secured to the walls 50 and 51. The door 62 is provided with handles 64 for manipulating the door.

Mounted in the walls 50 and 51, adjacent the lower edges of the walls 54 and 55, are conduits 65 provided with spray nozzles 66. These conduits are adapted to be supplied with water by means of a manifold conduit 67 (FIG. 5), the supply of water to this manifold conduit being controlled by a valve 68.

Figure 4:
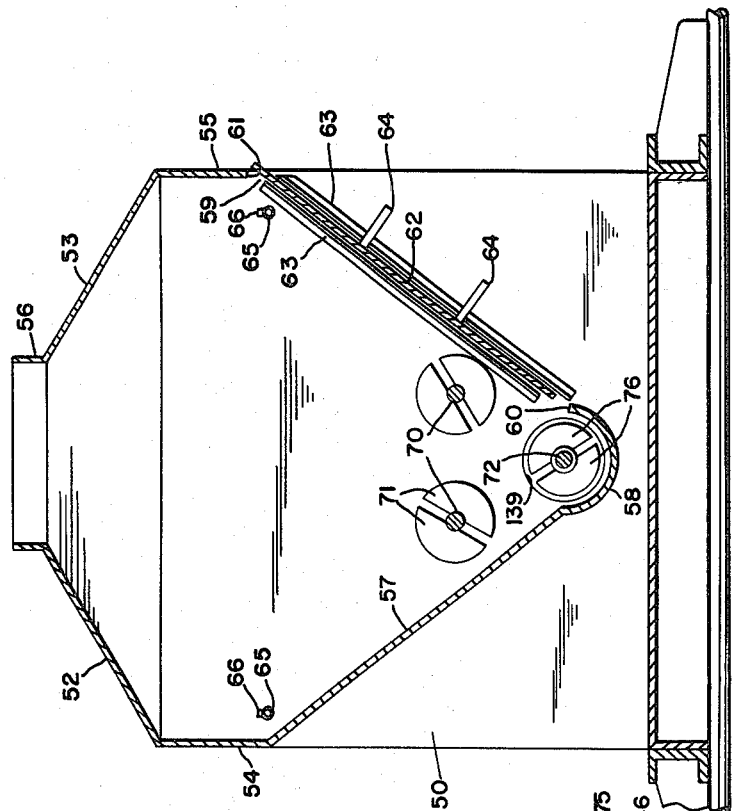
FIG. 4 is a fragmentary cross-sectional view, taken on the line 4—4 of FIG. 3.
Figure 3:
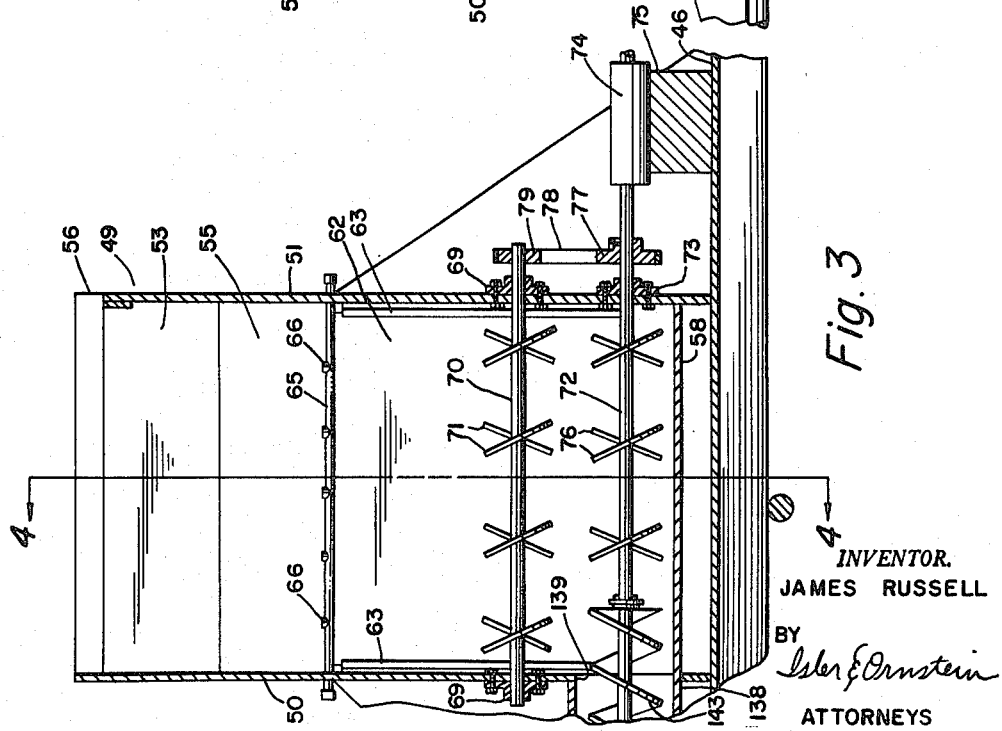
FIG. 3 is a fragmentary cross-sectional view, on an enlarged scale, taken on the line 3—3 of FIG. 1.

Mounted for rotation in bearings 69 secured to the walls 50 and 51 is a pair of laterally-spaced shafts 70, to each of which is rigidly secured, in the manner as shown in FIGS. 3, 4 and 6, a plurality of longitudinally spaced semi-circular discs 71, which serve a purpose to be presently described.

A drive shaft 72 is also provided, which is coaxial with the axis of the trough 58 and is mounted for rotation in a bearing 73 secured to the wall 51 and in a pressure take-up bearing 74 supported by a bearing rest 75 which is mounted on the bed 46 of the trailer. The shaft 72 also has rigidly secured thereto a plurality of longitudinally-spaced semi-circular discs 76 similar to the discs 71.

Rotation of the shafts 70 is effected by the shaft 72 through the intermediary of a sprocket 77, an endless chain 78 and sprockets 79.

The shaft 72 is driven by an engine 80 (FIGS. 1 and 2) mounted on the trailer bed 46.

Mounted on the collar 56 of the bin is a hood 81 (FIG. 2) having an opening 82 at the rear to receive the upper or unloading end of a conveyor housing, generally designated by reference numeral 83.

The housing 83 comprises a lower or tray portion 84 of channel-shaped cross-section, which is supported in a rearwardly and downwardly inclined position by the collar 56 and by a rest 85 mounted on the rear end of the bed 46 of the trailer. The tray portion 84 of the housing 83 is covered at its upper end with a chain support plate 86 (FIG. 7) and has secured to the side walls thereof, as by bolts 87 and nuts 88, an inverted member 89 of channel-shaped cross-section, the web 90 of which provides a chain rest in spaced relation to the plate 86.

The housing further includes a lid or cover 91, which may be made of sheet metal, and is removably secured to the member 89 by means of screws 92.

The tray portion 84 of the housing 83 has secured to the inner faces of the side walls thereof, spaced pairs of angles 93, which serve as guides or tracks for the endless chains 94 and 95 of a conveyor.

As best shown in FIGS. 7, 8, 9, 10 and 11, the chains 94 and 95 have secured thereto at spaced points therealong, as by welding, brackets 96 to which are secured, as by rivets 97, plates 98, provided with longitudinally-spaced rake members or claws 99, of V-shaped cross-section.

In order to maintain the rake members 99 at a desired inclination relatively to the plate 86, there is secured to each of the plates 98, at a point intermediate its ends, an element 100 which bears against the lower surface of the plate 86.

Figure 17:
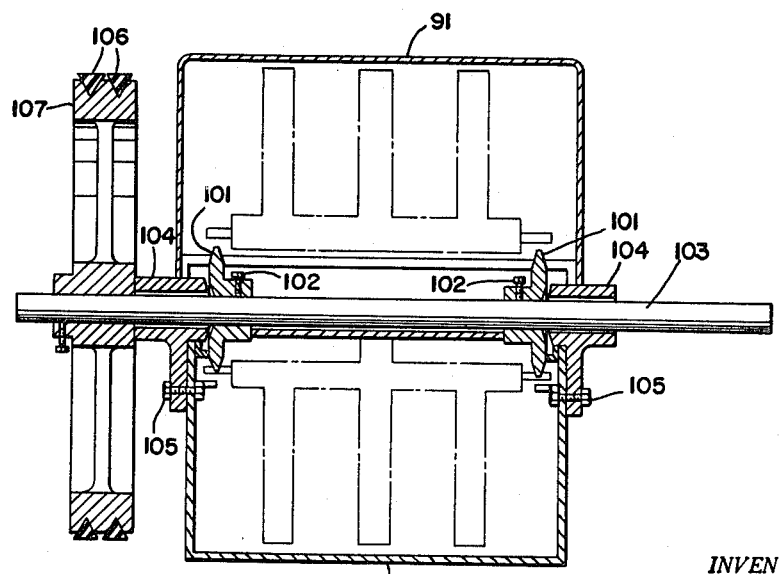
FIG. 17 is a fragmentary cross-sectional view, on an enlarged scale, taken on the line 17—17 of FIG. 2.

The conveyor chains 94 and 95 are driven by means of sprockets 101 (FIG. 17), which are secured, as by screws 102, to a shaft 103, mounted for rotation in bearings 104, which are secured, as by bolts 105, to the sides of the tray portion 84 of the housing 83.

The shaft 103 is driven by the engine 80 through the intermediary of V-belts 106 and a pulley 107, an adjustable idler wheel 107a being provided on the member 89 for the purpose of taking up slack in the belts 106.

Figure 14:
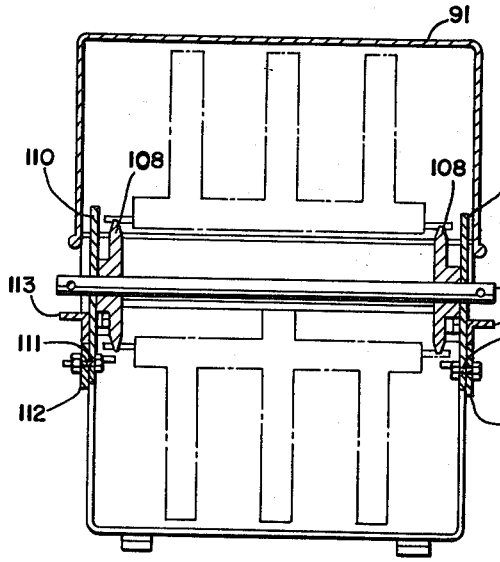
FIG. 14 is a fragmentary cross-sectional view, on an enlarged scale, taken on the line 14—14 of FIG. 2.
Figure 9:
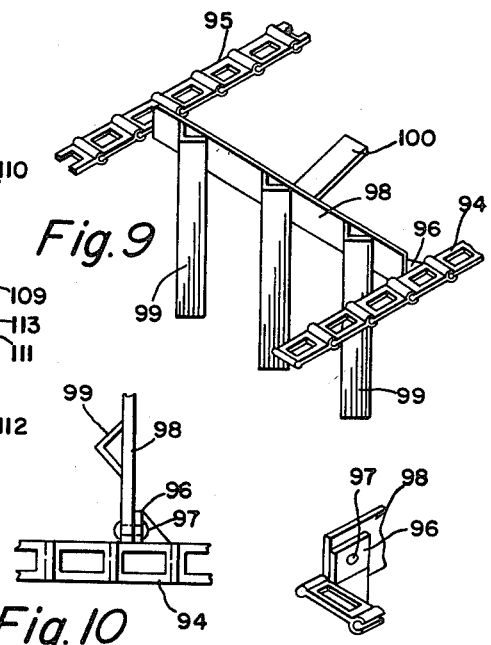
FIG. 9 is a fragmentary perspective view of a portion of the conveyor.
Figures 10, 11:
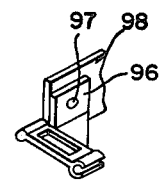
FIG. 10 is a fragmentary plan view of a portion of the conveyor shown in FIG. 9.
FIG. 11 is a fragmentary perspective view, showing the manner in which certain parts of the conveyor are connected to each other.
Figure 15:
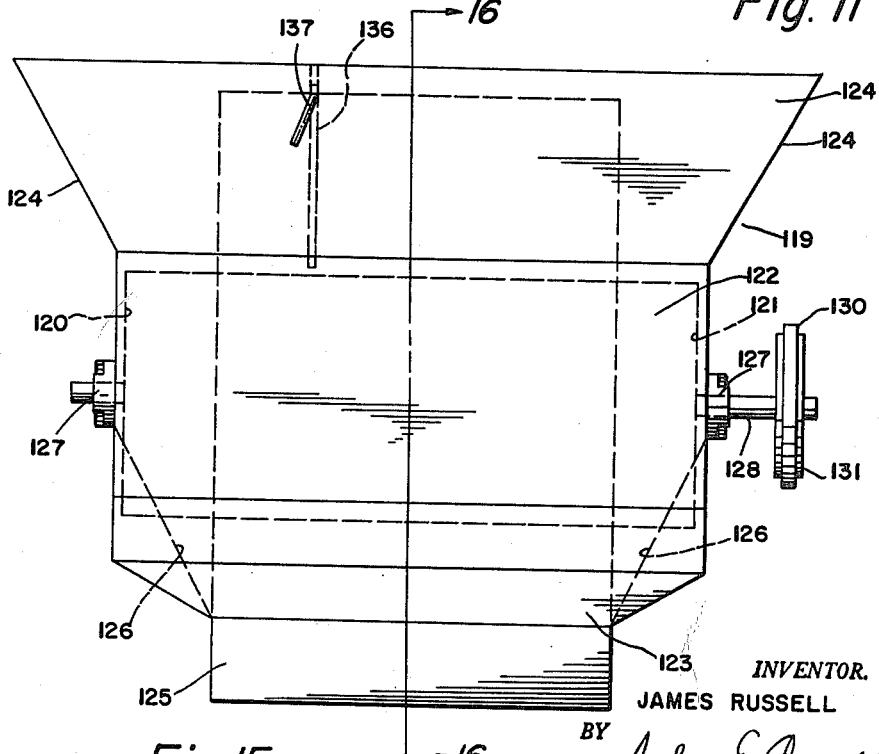
FIG. 15 is a rear elevational view, on an enlarged scale, of the loading end of the unit of FIG. 2.
Figure 12:
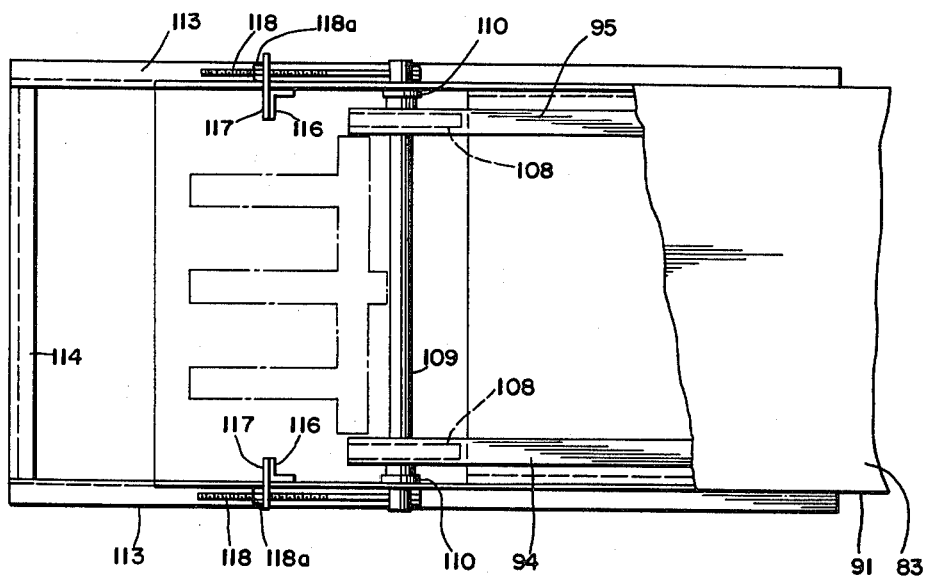
FIG. 12 is a fragmentary plan view, on an enlarged scale, of the unloading end of the conveyor, with portions broken away.
Figure 13:
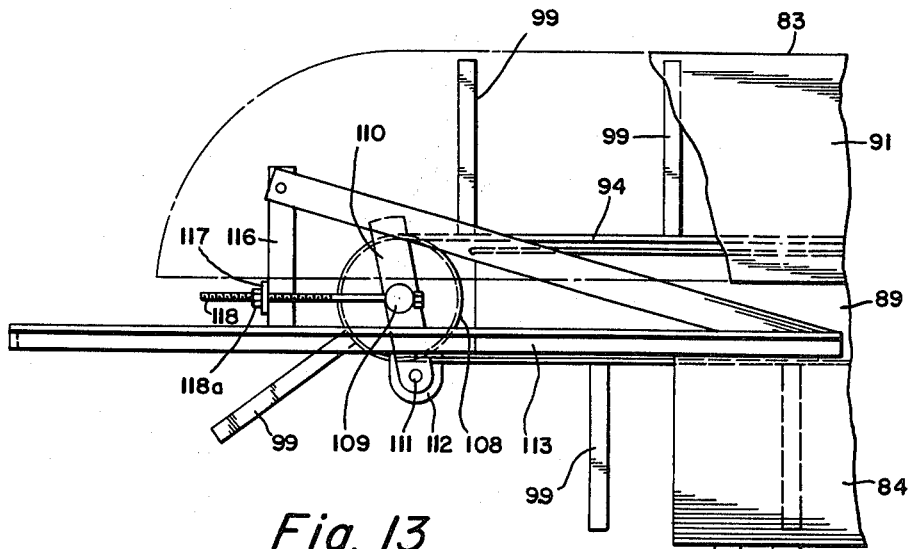
FIG. 13 is a fragmentary side elevational view of the unloading end of the conveyor, with portions broken aawy to better illustrate certain parts.

At the upper or unloading end of the aforesaid conveyor, the chains 94 and 95 run over idler sprockets 108 (FIG. 14) which are mounted on an idler shaft 109. The ends of the shaft 109 are journalled in arms 110, which are pivotally mounted, as at 111, on ears 112 which extend from a conveyor bracing structure consisting of members 113 which are secured and extend beyond the member 89 and a cross-member 114.

For the purpose of adjusting the tension of the chains 94 and 95, means are provided consisting of posts 116 which extend upwardly from the members 113 and to which are secured brackets 117. Screws 118 are provided which extend diametrically through the ends of the shaft 109 and through openings in the brackets 117, nuts 118 being attached to these screws at one side of the brackets. By adjusting the nuts 118a, the position of the shaft 109 may be adjusted to adjust the tension of or take up any slack in the chains 94 and 95.

At the lower or loading end of the conveyor, a hopper is provided, which is generally designated by reference numeral 119. This hopper consists of a body portion having end walls 120 and 121, a rear wall 122 and a sloping bottom 123. Above the body portion of the hopper, inclined walls 124 are provided which catch material dumped into the hopper and direct it into the body portion of the hopper. The material which is thus directed into the body portion of the hopper is directed through the open front of the body portion of the hopper into an extension 125 of the hopper, this extension being of a width slightly greater than the width of the conveyor housing, so as to receive the lower end of the conveyor housing. Deflector plates 126 are provided in the hopper for deflecting the material towards the extension 125.

The end walls 120 and 121 of the hopper body are provided with bearings 127 in which is journalled a shaft 128, which is driven by the shaft 103 through the intermediary of a pulley 129, an endless V-belt 130 and a pulley 131 mounted on one end of the shaft 128.

The shaft 128 has secured thereto, adjacent the end walls 120 and 121 of the hopper 119, circular plates or discs 132, between which circumferentially-spaced plates 133 extend, these plates extending radially from the shaft 128 to the cylindrical plane formed by the peripheral edges of the discs 132. The plates 133 provide compartments 134, which serve a purpose to be presently described. In order to insure that material dumped into these compartments 134 will be properly guided into the compartments, the front and rear walls 124 of the hopper 119 are provided with rubber blades 135 which extend to the periphery of the discs 132.

Figure 16:
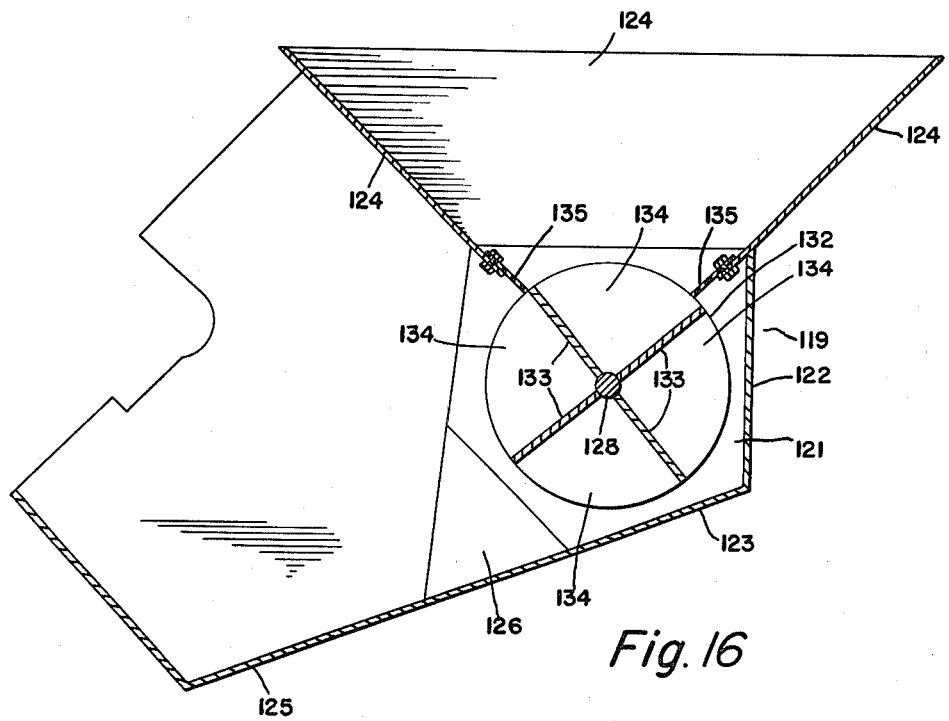
FIG. 16 is a cross-sectional view, taken on the line 16—16 of FIG. 15.

In order to divide the hopper 119 into separate portions for reception of the sand and gravel into one side of the hopper, and for the reception of dry cement into the other side of the hopper, a divider plate 136 is provided which is mounted on a shaft 137, the ends of which are supported in opposite walls 124 of the hopper 119, as shown in FIGS. 1 and 16.

The mixing unit also includes means for transporting or feeding the finished concrete from the trough 58 to the place or situs at which the concrete is to be laid.

Figure 2:
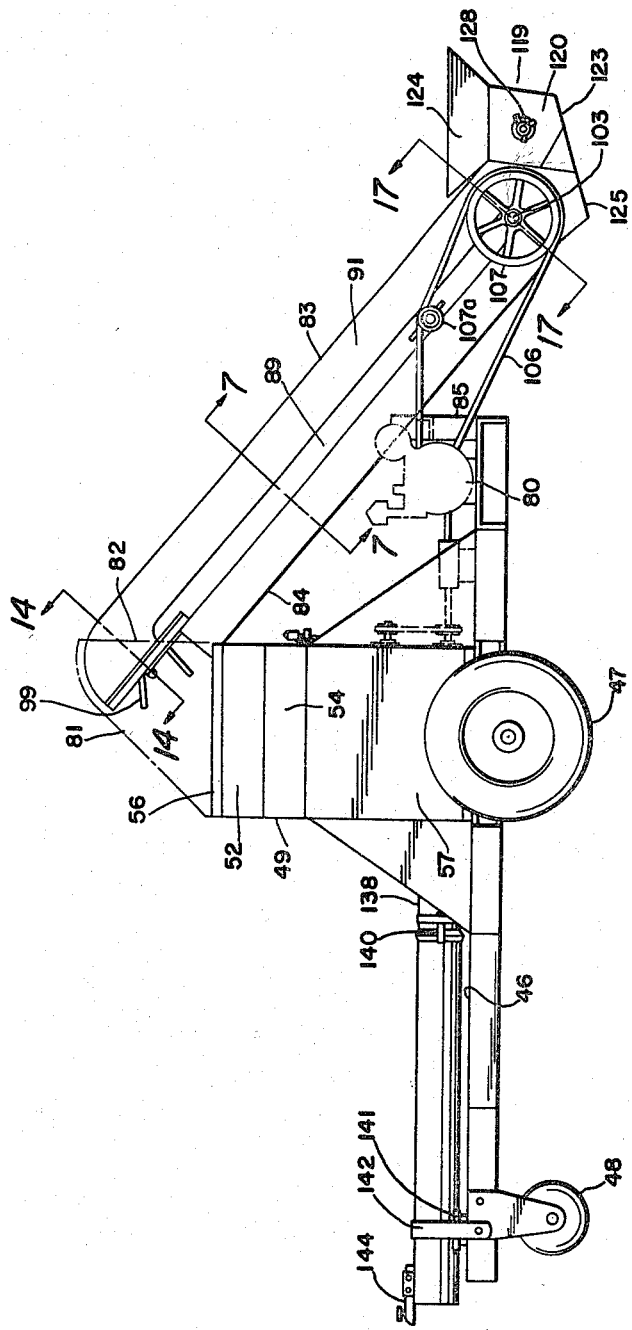
FIG. 2 is a side elevational view of the unit of FIG. 1.

The means for this purpose is best illustrated in FIGS. 1, 2 and 3 of the drawings, and comprises a pipe or conduit 138 which extends forwardly from a circular opening 139 in the wall 50 of the bin 49, adjacent the forward end of the trough 58.

This conduit 138 may extend forwardly from the trailer to any desired distance, and for this purpose, the conduit may be made of separate sections or lengths which may be clamped to each other, in end-to-end relation, as by means of coupling clamps, generally indicated by reference numeral 140. The conduit 138 may be supported at the front end of the trailer bed 46 on a rest 141 and may be clamped to this rest by means of a strap 142.

Extending through the conduit 138 is a screw conveyor 143, which is secured at its rear end to the shaft 72 so as to be driven by the latter. The screw conveyor may also be made of separate sections or lengths which may be secured to each other, in end-to-end relation, in any desired manner.

For the purpose of transporting the trailer by means of a truck or tractor, a trailer hitch 144 is mounted on the upper forward end of the conduit, it being understood that additional sections or lengths are not added to the conduit until the trailer has been unhitched from the tractor, at the site at which the concrete is to be laid.

The use and operation of the apparatus which has been described will now be explained.

A dump truck unit (not shown), loaded with cement, sand and gravel, may be used to haul the trailer unit to the site at which the concrete is to be laid, the dump truck unit, for this purpose, being provided with any conventional attachment which is normally used for connection to the trailer hitch 144 of the trailer unit.

Upon arrival at the aforesaid site, the trailer unit is disconnected from the tractor or dump truck unit, and any necessary number of conduit sections are added to form the conduit 138.

The dump truck unit is then positioned in such a manner that when the truck body is inclined, the materials from the truck can flow freely by gravity into the hopper 119, the cement flowing into the hopper at one side of the divider plate 136, and the sand and gravel into the hopper at the other side of the divider plate.

The engine 80 is started, so that the mechanisms driven by the engine are in operation just before the cement, sand and gravel are dumped into the hopper 119.

As these materials are dumped into the successive compartments 134, the contents of each compartment are dropped onto the sloping bottom 123 of the hopper 119 and slide to the bottom of the extension 125 of the hopper, from which point, the material is pushed by the rake members or claws 99 of the conveyor up and into the inclined space between the web 90 of the member 89 and the lid or cover 91. As this material traverses this plate, the conjoint action of the members 99 and the tumbling action of the material dropping back down along this inclined space causes the cement, sand and gravel to be thoroughly mixed by the time the material reaches the top of the space, so that the material is in such mixed form as it is dropped into the bin 49.

The mixed materials fall to the bottom of the bin, and as they fall, water is constantly supplied to the mixture through the spray nozzles 66.

At the bottom of the bin, the materials are constantly being mixed by the action of the discs 71 and 76. In this connection, it is to be noted that the discs 71 and 76 are so arranged on their shafts 70 and 72 as to thoroughly agitate and mix the materials with the water from the spray nozzles 66, so that the concrete is completely mixed and ready to be laid as it leaves the trough 58.

The concrete is fed from the trough 58 forwardly through the conduit 138 by the screw conveyor 143, and is discharged from the forward end of the conduit.

The parts 132, 133 and 134 constitute a metering device which is effective to feed the material, in increments, to the conveyor, the method of feeding the dry components of the concrete being especially advantageous. By swinging the divider plate 136 to different angular positions, by means of the handle 137, and maintaining the plate in its adjusted position, the relative proportions of the sand and gravel coming into one side of the hopper 119 and dry cement coming into the other side of the hopper can be easily varied to meet the requirements for different mixes. This imparts a metering function to the angularly adjustable plate 136, which is extremely useful in apparatus of this character.

It is thus seen that I have provided a method and apparatus for making and preparing concrete which enables conventional dump trucks and trailers to be used as components of the apparatus, thereby greatly reducing the initial cost as well as maintenance of the apparatus.

It is also seen that I have provided a novel apparatus which greatly reduces the labor and cost of preparing and pouring or distributing concrete, and which enables the ingredients to be quickly and easily transported to the field or site at which the concrete is to be poured or laid.

It is to be understood that the form of my invention, herewith shown and described, is to be taken as a preferred example of the same, and that various changes may be made in the shape, size and arrangement of parts thereof, without departing from the spirit of the invention, or the scope of the subjoined claims.

Having thus described my invention, I claim:

1. Apparatus for feeding and simultaneously mixing components to make concrete, said apparatus comprising a hollow housing of rectangular cross-section disposed at a substantial inclination to the horizontal, said housing having a stationary substantially flat member extending transversely of said housing and inclined at the same angle as said angle of inclination of said housing, means for feeding said components upwardly and along said member, said means comprising a pair of laterally-spaced endless conveyor chains disposed adjacent the side walls of said housing, the upper run of said chains resting on said member, cross-bars connected to said chains at spaced intervals, and a plurality of laterally-spaced rake bars extending from said cross-bars and substantially at right angles to the plane of said member, and means for causing said chains to move relatively to said member, whereby said components are pushed upwardly by said rake bars and along said member, the conjoint action of said rake bars and the tumbling action of said components dropping back down along said member causing said components to be thoroughly mixed by the time said components reach the upper end of said inclined member.

2. Apparatus, as defined in claim 1, in which said rake bars are of V-shaped cross-section.

References Cited by the Examiner

UNITED STATES PATENTS

| | | | |
|---|---|---|---|
| 831,658 | 9/06 | Ericsson | 198—168 X |
| 1,255,750 | 2/18 | Humphery | 259—178 X |
| 1,557,839 | 10/25 | Hodgson | 259—146 X |
| 1,754,533 | 4/30 | Van Kirk | 259—169 X |
| 2,017,439 | 10/35 | Grayson | 259—178 X |
| 2,104,191 | 1/38 | Flynn | 259—152 |
| 2,169,463 | 8/39 | Eisenber | 298—7 |
| 2,361,654 | 10/44 | Roberts | 298—7 |
| 2,687,285 | 8/54 | Fisher | 259—154 |
| 2,948,519 | 8/60 | Bradshaw et al. | 259—154 |
| 2,975,884 | 3/61 | Kayser | 214—2 X |

WALTER A. SCHEEL, *Primary Examiner.*

J. S. SHANK, CHARLES A. WILLMUTH,
*Examiners.*